United States Patent
Ikeda et al.

(10) Patent No.: US 7,602,799 B2
(45) Date of Patent: Oct. 13, 2009

(54) NETWORK MANAGEMENT METHOD, PROGRAM AND SYSTEM FOR CONSTRUCTING A PARALLEL COMPUTER SYSTEM

(75) Inventors: Yoshiro Ikeda, Kawasaki (JP); Akihiro Yasuo, Kawasaki (JP); Atsushi Mori, Kawasaki (JP); Akira Asato, Kawasaki (JP); Katsuhiko Nishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 467 days.

(21) Appl. No.: 11/476,630

(22) Filed: Jun. 29, 2006

(65) Prior Publication Data

US 2007/0211628 A1 Sep. 13, 2007

(30) Foreign Application Priority Data

Mar. 10, 2006 (JP) .............................. 2006-065691

(51) Int. Cl.
H04L 12/54 (2006.01)
(52) U.S. Cl. ...................................... 370/419; 370/359
(58) Field of Classification Search ................. 370/230, 370/357–360, 419
See application file for complete search history.

(56) References Cited

U.S. PATENT DOCUMENTS 6,298,061 B1 * 10/2001 Chin et al. .................. 370/400
2003/0152087 A1 * 8/2003 Shahoumian et al. ....... 370/401
2006/0259792 A1 * 11/2006 Dove .......................... 713/300

FOREIGN PATENT DOCUMENTS

| JP | 2001-320415 | 11/2001 |
|----|-------------|---------|
| JP | 2002-232427 | 8/2002  |

* cited by examiner

*Primary Examiner*—Jayanti K Patel
*Assistant Examiner*—Matthew Campbell
(74) *Attorney, Agent, or Firm*—Staas & Halsey LLP

(57) ABSTRACT

A network management apparatus interconnects a plurality of computers through physical lines having a predetermined line speed to manage a switch apparatus constructing a parallel computer system. The switch apparatus comprises a plurality of physical port units to enable or disable the same through individual power supply ON/OFF control for the physical port units, thereby changing and controlling the line transmission speed according to the enable number. A logical port constructing unit in the network management apparatus bundles the physical lines by a plurality of physical port units in the switch apparatus to construct logical lines. A port control unit changes the number of operations of a plurality of physical port units assigned to the logical port units through the power supply ON/OFF control according to a necessary data transmission speed for the logical port units, thereby dynamically changing the line transmission speed.

15 Claims, 13 Drawing Sheets

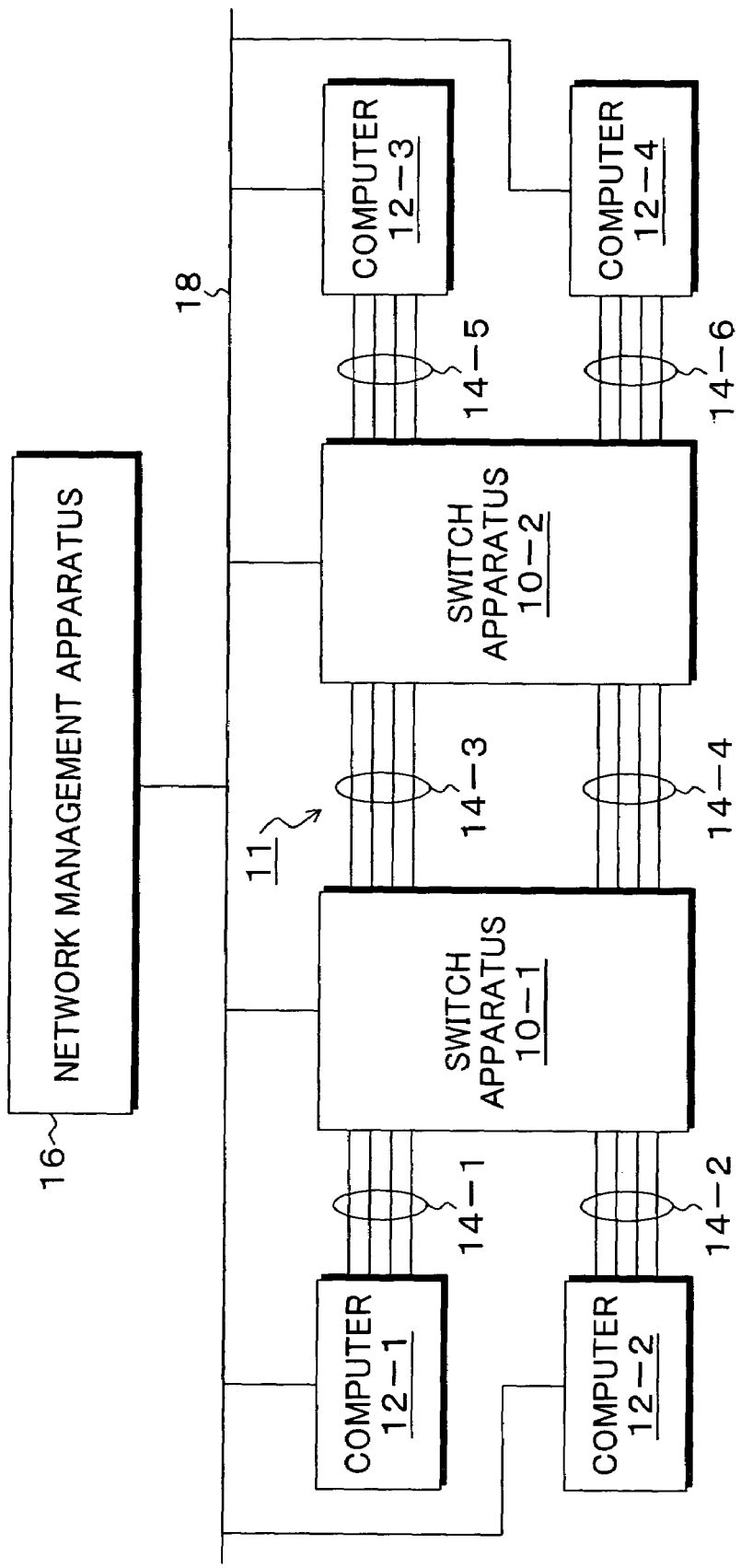

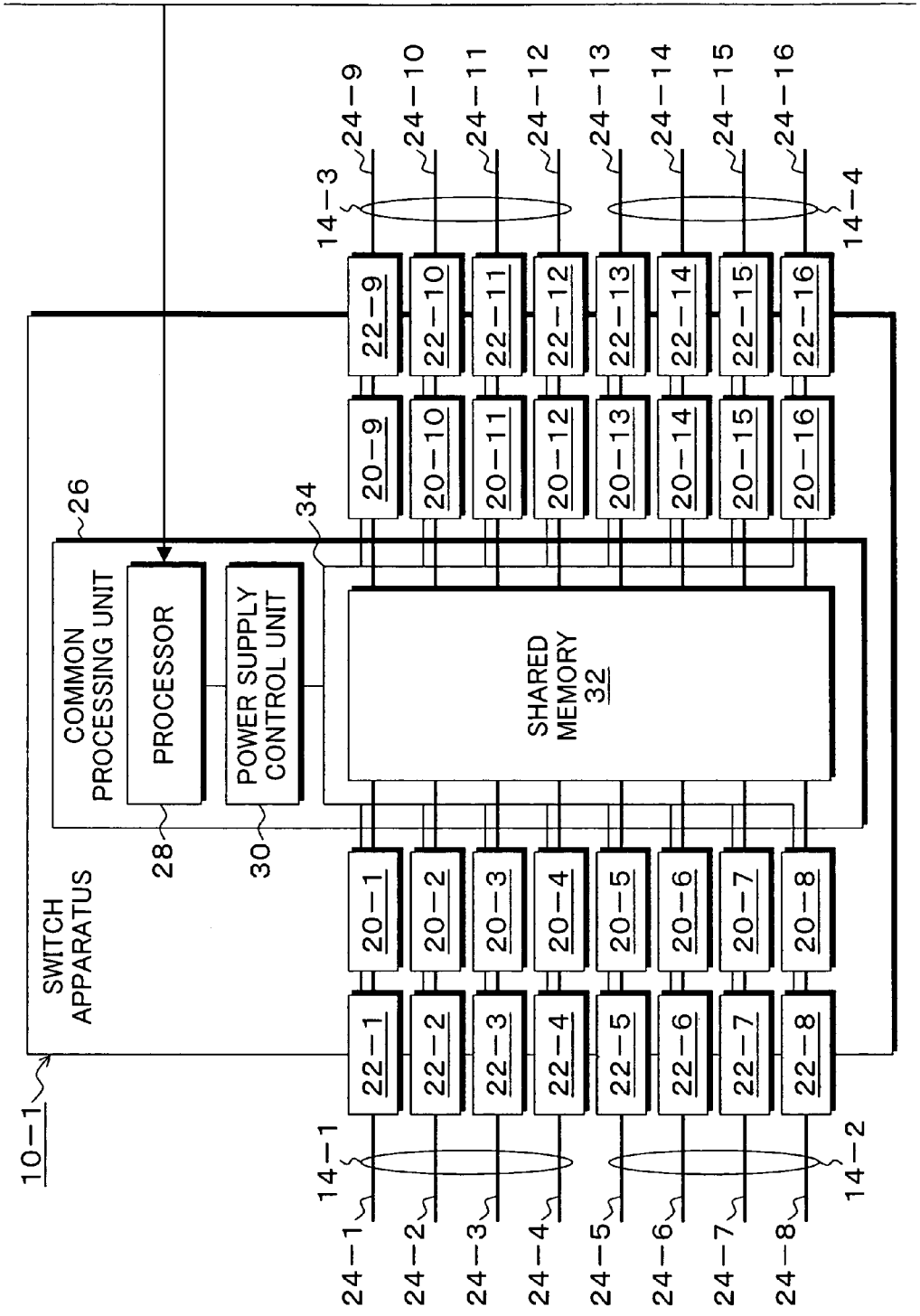

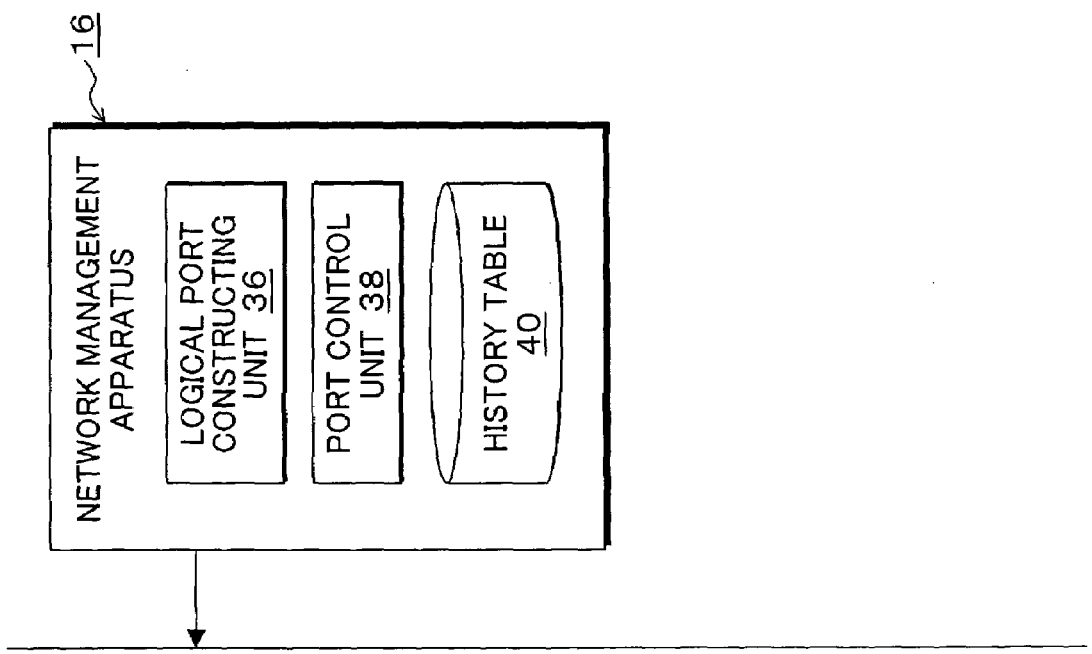

FIG. 6

| LOGICAL PORT NUMBER | PHYSICAL PORT NUMBER |
|---|---|
| L001 | P001, P002, P003, P004 |
| L002 | P005, P006, P007, P008 |
| L003 | P009, P010, P011, P012 |
| L004 | P013, P014, P015, P016 |

FIG. 7

| MODE | NECESSARY DATA TRANSMISSION SPEED | PHYSICAL PORT NUMBER | | | |
|---|---|---|---|---|---|
| | | P001 | P002 | P003 | P004 |
| 1 | LESS THAN 1Gbps | ○ | × | × | × |
| 2 | BETWEEN 1Gbps AND 2Gbps | ○ | ○ | × | × |
| 3 | BETWEEN 2Gbps AND 3Gbps | ○ | ○ | ○ | × |
| 4 | MORE THAN 3Gbps | ○ | ○ | ○ | ○ |

82

NETWORK MANAGEMENT METHOD, PROGRAM AND SYSTEM FOR CONSTRUCTING A PARALLEL COMPUTER SYSTEM This application is a priority based on prior application No. JP 2006-065691, filed Mar. 10, 2006, in Japan.

BACKGROUND OF THE INVENTION

1. Field of the Invention

The present invention relates to a network management method, program and apparatus for managing an interconnecting network where a plurality of computers are interconnected by switch apparatuses to construct a parallel computer system, and particularly to a network management method, program and apparatus for an interconnecting network where a plurality of physical lines connecting switch apparatuses are bundled to assume one logical line, thereby enhancing a line transmission speed (band).

2. Description of the Related Arts

Conventionally, there has been constructed a parallel computer system such as cluster system through an interconnecting network (interconnect) for mutually connecting many computers through switch apparatuses having a line transmission speed of giga-bit order. When the number of computers for constructing the parallel computer system is large, in many cases, many switch apparatuses are used for the interconnecting network for connecting each computer (interconnect) and a plurality of lines are provided between the switch apparatuses to logically assume one line so as not to decrease the line transmission speed (bit rate of bps) between the switch apparatuses, thereby enhancing the line transmission speed. A method for bundling a plurality of physical lines to logically assume one high-speed line in this manner is called trunking (JP2002-232427). Since the line transmission speed defined by bit rate (bps) increases along with spread in a band of the line, the line transmission speed is customarily represented as the band of line, and, for example, the expression that the band of line increases (expands) means that the line transmission speed increases. In the parallel computer system, many power saving methods are applied for elements such as processor, memory and hard disk drive, etc. constituting an individual computer. On the other hand, a switch apparatus which constitutes a network connecting a plurality of computers is always in a powered state and operates in a state where data transmission at a maximum data transmission speed determined by the line transmission speed can be always provided. Further, as a method for performing power saving of the switch apparatuses constituting a network, there has been proposed a method for monitoring packet incoming to perform disabling and enabling of port function units (JP2001-320415).

However, in the conventional interconnecting network where there is trunking in which a plurality of physical lines are bundled to assume one logical line, in many cases, the maximum data transmission speed corresponding to the line transmission speed is required in a short time, and communication at a data transmission speed lower than the line transmission speed is made for most time so that an excessive line communication speed is provided for the necessary data transmission speed. For example, in JP2002-232427, although a plurality of physical lines are provided between switches to enhance the line transmission speed, even in the case of less communication, the less communication is evenly divided into the plurality of physical lines, and consequently the data transmission speed is lowered for the line transmission speed of the physical lines, which is wasteful, and nevertheless all the port units are operating so that power saving cannot be expected. In a method for monitoring packet incoming to perform disabling and enabling of the port units in JP2001-320415, since the lines are completely shut off logically when disabling the port units, there is a problem that the network form is changed to cause large adverse effect on the system.

SUMMARY OF THE INVENTION

According to the present invention to provide a network management method, program and system for dynamically providing a line transmission speed corresponding to a data transmission speed through power supply ON or power supply OFF of port units to reduce consumed power in an interconnecting network where there is trunking in which a plurality of physical lines connecting switch apparatuses are bundled to assume one logical line.

(Method)

The present invention provides a network management method. The present invention is constituted so that a network management method for managing an interconnecting network which has a plurality of switch apparatuses comprising a plurality of physical port units having a predetermined line transmission speed (band) and interconnects a plurality of computers through physical lines connected to the physical port units in the plurality of switch apparatuses to construct a parallel computer system comprises:

a logical line constructing step bundling the physical lines connected to the plurality of port units in the switch apparatuses to construct one logical line; and a port control step enabling or disabling the physical lines by powering ON or powering OFF the plurality of physical port units in the switch apparatuses to change to a line transmission speed corresponding to a necessary data transmission speed between the computers.

The physical port units in the switch apparatuses are connected to the physical lines via external port units, and power supply ON/OFF control is performed on the physical port units and the external port units.

The port control step comprises:

a port disabling step of, each time of determining that a necessary data transmission speed between the computers lowers a line transmission speed for each line of the physical lines, sequentially powering OFF and disabling physical port units provided for each of the physical lines according to a predetermined priority; and a port enabling step of, each time of determining that a necessary data transmission speed between the computers exceeds a line transmission speed for each line of the physical lines, sequentially powering ON and enabling the disabled physical port units in a reverse order to the priority.

The port control step powers ON or powers OFF the physical port units based on a data transmission speed detected from the logical line.

The port control step produces a predicted time schedule of the data transmission speed of the logical line from a communication history acquired from the switch apparatuses, and powers ON or powers OFF the physical port units based on the predicted time schedule.

The port control step powers ON or powers OFF the physical port units based on the predicted time schedule of the necessary data transmission speed for each house in 24 hours or the predicted time schedule of the necessary data transmission speed for each day in one week.

The port control step controls number of operation of physical port units based on the number of usable computers connected to the logical port units of switch apparatuses.

The port control step powers ON or powers OFF the physical port units based on a necessary data transmission speed notified along with execution of special instructions embedded at the start and end of a program job executed in the computers connected to the logical lines of the switch apparatuses.

The port control step powers ON or powers OFF the physical port units based on a data transmission speed notified through a setting operation immediately before starting a job by the computers connected to the logical lines of the switch apparatuses.

(Program)

The present invention provides a network management program. A network management program according to the present invention is constituted to cause a computer in a network management apparatus for managing an interconnecting network which has a plurality of switch apparatuses comprising a plurality of physical port units having a predetermined line transmission speed (band) and interconnects a plurality of computers through physical lines connected to the physical port units in the plurality of switch apparatuses to construct a parallel computer system to execute:

a logical line constructing step bundling the physical lines connected to the plurality of physical port units in the switch apparatuses to construct one logical line; and a port control step enabling or disabling the physical lines by powering ON or powering OFF the plurality of physical port units in the switch apparatuses to change to a line transmission speed corresponding to a necessary data transmission speed between the computers.

(System)

The present invention provides a network management system. A network management system according to the present invention is constituted to comprise an interconnecting network which has a plurality of switch apparatuses comprising a plurality of physical port units having a predetermined line transmission speed (band) and interconnects a plurality of computers through physical lines connected to the physical port units of the plurality of switch apparatuses to construct a parallel computer system; and a network management apparatus for managing the switch apparatuses in the interconnecting network, wherein the network management apparatus comprises:

a logical line constructing unit for bundling the physical lines connected to the plurality of physical port units in the switch apparatuses to construct one logical line; and a port control unit for enabling or disabling the physical lines by powering ON or powering OFF the plurality of physical port units in the switch apparatuses to change to a line transmission speed corresponding to a necessary data transmission speed between the computers.

According to the present invention, in the switch apparatuses in which physical lines connected to a plurality of physical port units are bundled to assume one logical line, a plurality of physical port units constituting the logical line are individually powered ON or powered OFF for enabling or disabling, thereby dynamically changing a line transmission speed (band) of the logical line according to a necessary data transmission speed, and lowers the line transmission speed by powering OFF the physical port units which provide an excessive line transmission speed and disabling the physical lines when the data transmission speed is low, thereby restricting consumed power to the minimum. Further, since the line transmission speed of the logical line is dynamically changed by enabling or disabling the physical lines through power supply ON or power supply OFF of the physical port units, at least one physical line is enabled even when the data transmission speed is low so that the logical line is not disconnected and a change in the network form will not occur. The prediction of the necessary data transmission speed based on a communication history in the switch apparatuses, the explicit securing and releasing of the necessary data transmission speed through a computer user's operation instruction, and further the securing and releasing of the necessary data transmission speed based on execution of special instructions embedded in a computer program for executing a job are performed to dynamically change the line transmission speed of the logical line according to the necessary transmission speed, thereby flexibly and economically providing the line transmission speed between the switch apparatuses while reducing consumed power according to the current operating situation of the computers connected through the interconnecting network. The above and other objects, features, and advantages of the present invention will become more apparent from the following detailed description with reference to the drawings.

BRIEF DESCRIPTION OF THE DRAWINGS

FIG. 1 is an explanatory diagram of a parallel computer system according to one embodiment of the present invention;

FIGS. 2A and 2B are explanatory diagrams of a switch apparatus and a network management apparatus according to the present embodiment;

FIG. 6 is an explanatory diagram of a logical line reservation table used in a logical port constructing unit according to the present embodiment;

FIG. 7 is an explanatory diagram of a port power supply control table indicating power supply control patterns for physical port units based on a necessary data transmission speed of a logical line;

DETAILED DESCRIPTION OF THE PREFERRED EMBODIMENTS

Figure 3:
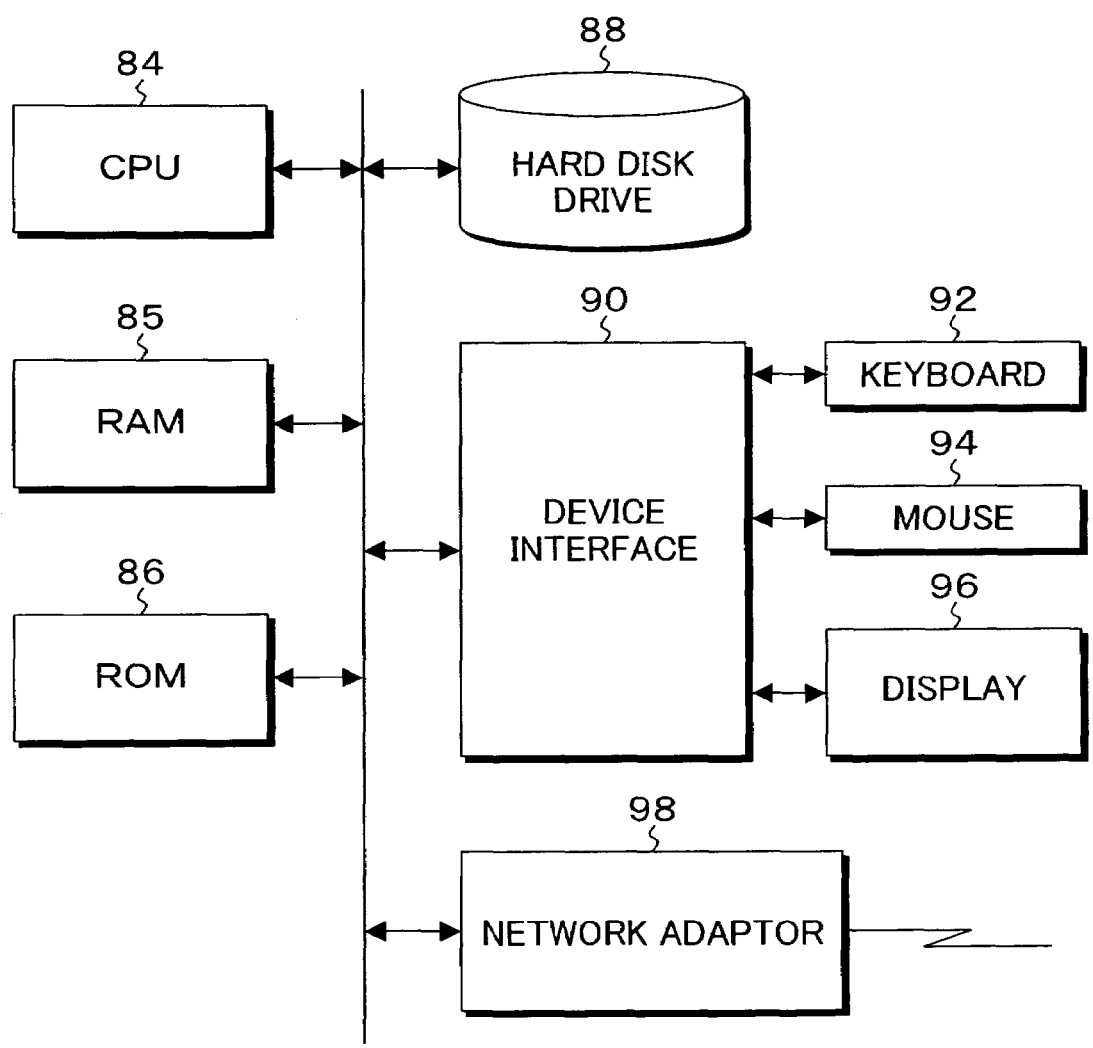
FIG. 3 is a block diagram of a computer hardware environment on which a program of the network management apparatus according to the present embodiment is executed.

FIG. 1 is an explanatory diagram of a parallel computer system according to one embodiment of the present invention. In FIG. 1, switch apparatuses 10-1, 10-2 functioning as a network switch interconnect four computers 12-1 to 12-4 through physical lines to constitute an interconnecting network (interconnect) 11 of the parallel computer system in the present embodiment. The switch apparatuses 10-1, 10-2 bundle four physical lines in one line to construct logical lines 14-1 to 14-6 in the present embodiment where 16 physical lines are connectable. The computers 12-1, 12-2 are connected to the switch apparatus 10-1 through the logical lines 14-1, 14-2, the switch apparatuses 10-1 and 10-2 are connected through the logical lines 14-3, 14-4, and further the computers 12-3, 12-4 are connected to the switch apparatus 10-2 through the logical lines 14-5, 14-6. In the interconnecting network (interconnect) 11 where the computers 12-1 to 12-4 are interconnected through such switch apparatuses 10-1, 10-2, interconnection can be established in 1 to 1 or 1 to n through the switch apparatuses 10-1, 10-2 between the computers 12-1 to 12-4 as needed. A network management apparatus 16 for managing the interconnecting network (interconnect) 11 is provided for the switch apparatuses 10-1, 10-2. The network management apparatus 16 is connected to the switch apparatuses 10-1, 10-2 and the computers 12-1 to 12-4 through a LAN 18. The switch apparatuses 10-1, 10-2 can perform individual ON/OFF control of power supply for the internal physical port units connecting 16 physical lines, respectively, and can enable or disable the physical lines by power supply ON or OFF for the physical port units.

FIGS. 2A and 2B are explanatory diagrams showing a switch apparatus and a network management apparatus according to the present embodiment. In FIGS. 2A and 2B, the switch apparatus 10-1 is manufactured as a semiconductor integrated circuit or package incorporated circuit board, where 16 physical port units 20-1 to 20-16 are provided for a common processing unit 26, optical modules are connected as external port units 22-1 to 22-16 to the physical port units 20-1 to 20-16 in the present embodiment, and optical fiber lines extracted from the external port units 22-1 to 22-16 constitute physical lines 24-1 to 24-16. The common processing unit 26 is provided with a processor 28, a power supply control unit 30 and a shared memory 32. The processor 28 is incorporated with a firmware capable of individually controlling the physical port units 20-1 to 20-16 and the external port units 22-1 to 22-16 using optical modules. The power supply control unit 30 performs power supply to the physical port units 20-1 to 20-16 and the external port units 22-1 to 22-16 through a power supply line 34 and can individually perform ON/OFF control of the power supply to each port unit to enable the physical lines by power supply ON and to disable the physical lines by power supply OFF. The shared memory 32 performs data transfer between the physical port units 20-1 to 20-16 using a FIFO function, for example. The function of the shared memory 32 can be substituted by a crossbar. The network management apparatus 16 provided as an external control terminal for the switch apparatus 10-1 comprises a logical port constructing unit 36, a port control unit 38 and a history table 40. The logical port constructing unit 36 constitutes logical lines 14-1 to 14-4 in which physical lines 24-1 to 24-16 connected to the physical port units 20-1 to 20-16 and the external port units 22-1 to 22-16 in the switch apparatus 10-1 are bundled by the predetermined lines such as 4 lines in the present embodiment, for example. The port control unit 38 enables or disables the physical lines by 4 lines constituting the logical lines 14-1 to 14-4 through ON/OFF control of the four physical port units to dynamically change the line transmission speed, thereby providing the line transmission speed corresponding to the necessary data transmission speed for the logical lines 14-1 to 14-4. The physical lines according to the data transmission speed are always enabled and the remaining physical lines are disabled so that the line transmission speed of the logical lines 14-1 to 14-4 are secured, and the power supplies of the port units are turned OFF for the unwanted physical lines, thereby achieving reduction in consumed power. The history table 40 is supplied with a data transmission speed detected from the physical port units 20-1 to 20-16 in the switch apparatus 10-1 as communication history. The data transmission speed is detected using a packet counter, for example, and is detected by counting the data packets received in the physical port units 20-1 to 20-16. Since the line transmission speed is controlled by the logical lines in the present embodiment, the data transmission speed is stored as communication history by the logical lines 14-1 to 14-4. The port control unit 38 acquires the necessary data transmission speed for dynamically changing the line transmission speed through power supply ON/OFF of the physical ports and external ports constituting the logical lines 14-1 to 14-4 in the switch 10-1 from any one of the following:

(1) Necessary data transmission speed by constant monitoring of the logical lines
(2) Necessary data transmission speed by prediction based on communication history
(3) Necessary data transmission speed based on the number of usable computers
(4) Necessary data transmission speed by program embedded special instructions along with job execution of the computers
(5) Necessary data transmission speed on job execution by computer-user's operation instruction The port control unit 38 determines the enable number by the power supply control of the port units according to the necessary data transmission speed through the power supply ON/OFF control for the physical port units 20-1 to 20-16 and external port units 22-1 to 22-16 corresponding to the target logical lines 14-1 to 14-4 based on any one necessary data transmission speed (1) to (5), thereby dynamically setting an optimum line transmission speed corresponding to the necessary transmission speed. For example, the logical line 14-1 is constituted of four physical lines 24-1 to 24-4, and when the line transmission speed per one of the physical lines 24-1 to 24-4 is assumed at 1 Gbps, the line transmission speed of the logical line 14-1 can be switched as the line transmission speed of 1 Gbps when the enable number is 1, the line transmission speed of 2 Gbps when the enable number is 2, the line transmission speed of 3 Gbps when the enable number is 3, and the line transmission speed of 4 Gbps when the enable number is 4 for the four pairs of the four physical port units 20-1 to 20-4 and the external port units 22-1 to 22-4.

FIG. 3 is a block diagram showing a computer hardware environment on which a program of the network management apparatus 16 according to the present embodiment is executed. In FIG. 3, a CPU 84 is connected with a ROM 86, a RAM 85, a hard disk drive 88, a device interface 90 to which a keyboard 92, a mouse 94 and a display 96 are connected, and a network adapter 98 via a bus. A network management program according to the present embodiment is stored in the hard disk drive 88, and the network management program is read out from the hard disk drive 88 and stored in the RAM 85 to be executed by the CPU 84 after the reading development of the OS with respect to the RAM 85 after boot-up on starting the computer.

Figure 4:
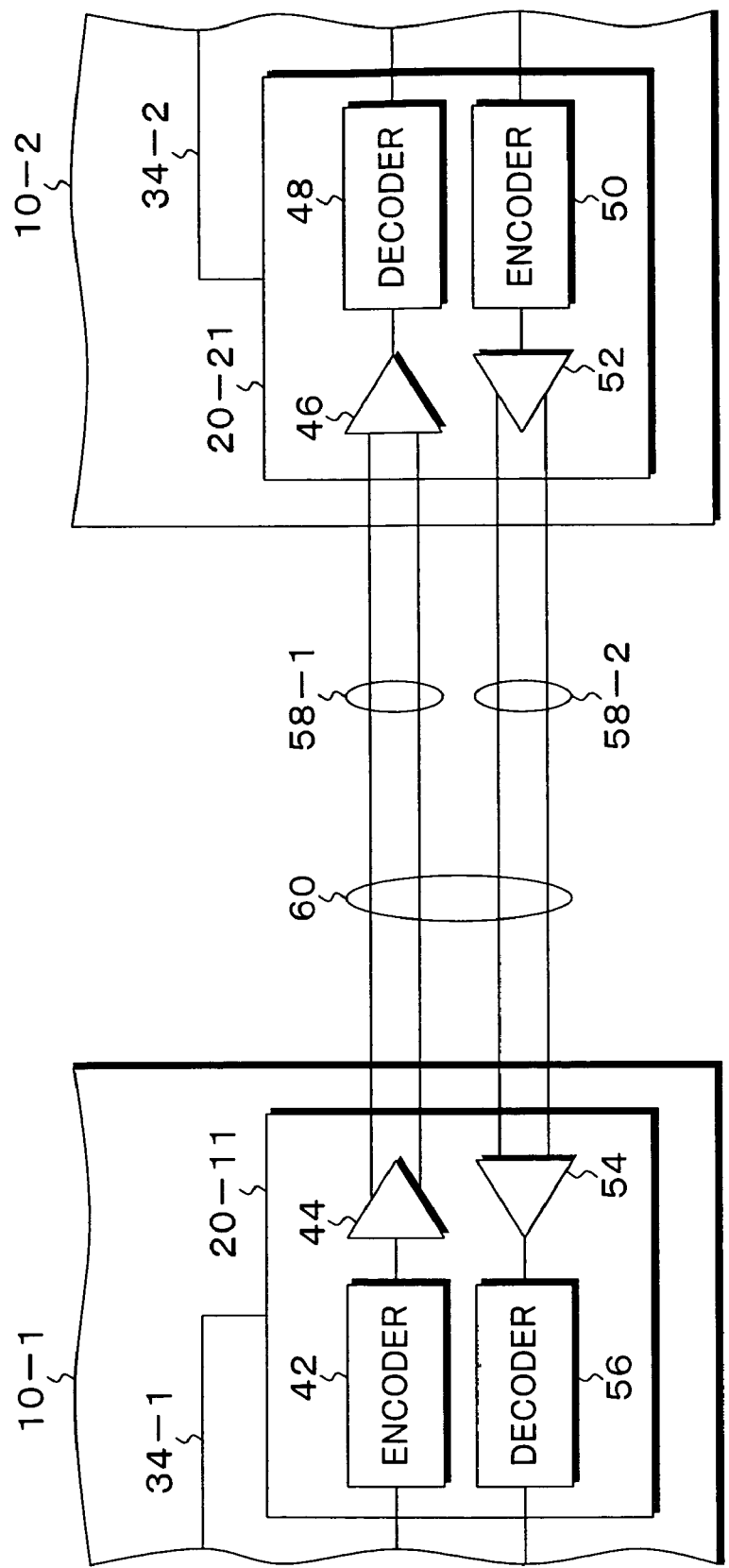
FIG. 4 is an explanatory diagram of physical port units and physical lines in the switch apparatuses according to the present embodiment.

FIG. 4 is an explanatory diagram of physical port units and physical lines in the switch apparatuses according to the present embodiment. FIG. 4 takes up network connection between the switch apparatuses 10-1 and 10-2 of FIG. 1. In FIG. 4, the switch apparatus 10-1 is provided with the physical port unit 20-11, and the physical port unit 20-11 is provided with an encoder 42, a driver 44, a receiver 54 and a decoder 56 to be enabled or disabled by power supply ON or OFF through the power supply line 34-1. The switch apparatus 10-2 is also provided with the physical port unit 20-21, and the physical port unit 20-21 is provided with a receiver 46, a decoder 48, an encoder 50 and a driver 52. The driver 44 of the physical port unit 20-11 is connected to the receiver 46 of the switch apparatus 10-2 via a balanced line 58-1. The driver 52 of the switch apparatus 10-2 is connected to the receiver 54 of the switch apparatus 10-1 via a balanced line 58-2. The two balanced lines 58-1, 58-2 are usually called lane, and one lane constitutes a physical line 60. The encoders 42, 50 provided in the physical port units 20-11, 20-21 perform 8-bit/10-bit conversion on a serial bit string transferred along with the packet communication, for example. The decoders 48, 56 perform 10-bit/8-bit conversion on the serial bit data received in the receivers 46, 54 for recovery. The line transmission speed of the physical line 60 by the physical port units 20-11, 20-21 is determined by a clock speed which operates the physical port units 20-11, 20-21, and attains the line transmission speed (bit rate) of 1 Gbps, for example.

Figure 5:
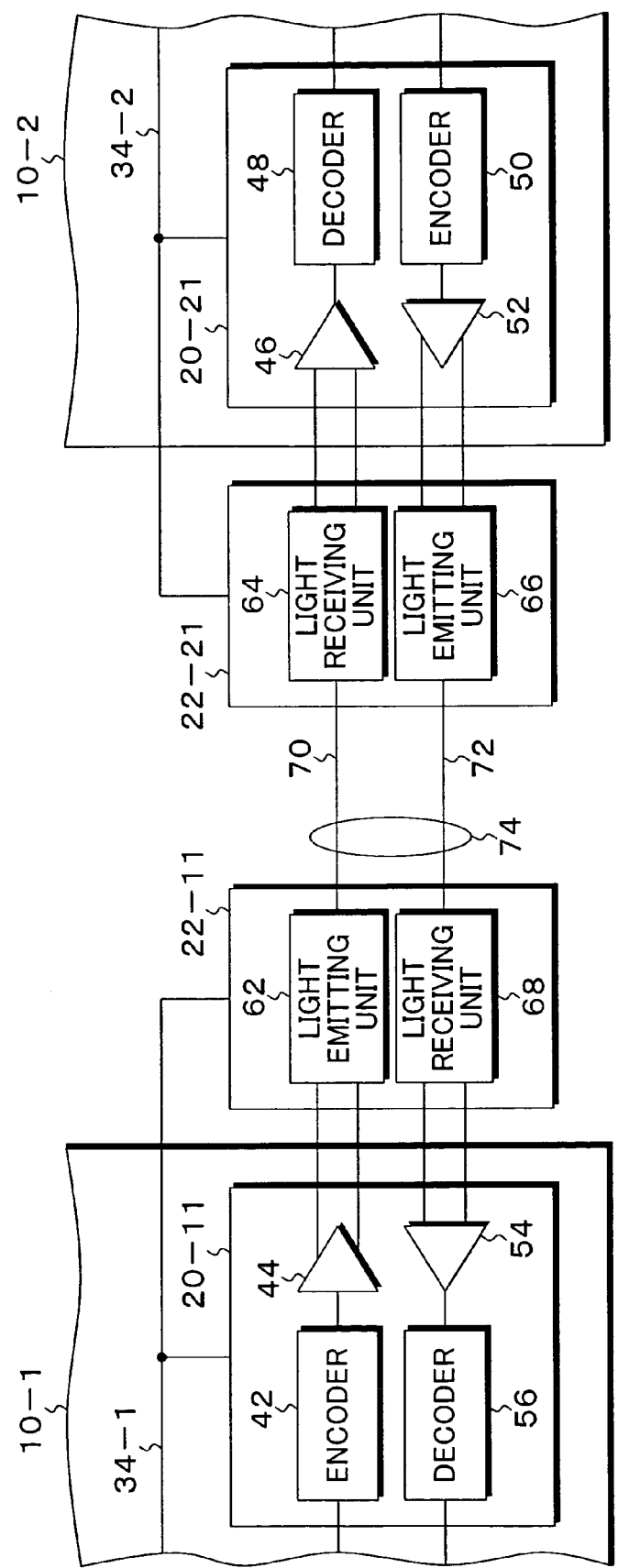
FIG. 5 is an explanatory diagram of physical port units and physical lines in the switch apparatuses with an external port unit.

FIG. 5 is an explanatory diagram of physical port units and physical lines in the switch apparatuses with an external port unit. In FIG. 5, the external port units 22-11, 22-21 made of optical module are connected to the outside of the physical port units 20-11, 20-21 of the switch apparatuses 10-1, 10-2 of FIG. 4. The external port units 22-11, 22-21 are provided with light emitting units 62, 66 and light receiving units 64, 68, respectively, optical fibers 70, 72 connect therebetween, and a physical line 74 is constituted of the optical fibers 70, 72. The power supply lines 34-1, 34-2 are connected to the external port units 22-11, 22-21 from the switch apparatuses 10-1, 10-2, respectively, and the power supply ON/OFF control is performed at the same time with the physical port units 20-11, 20-21. FIG. 6 is an explanatory diagram of a logical line reservation table 76 used in the logical port constructing unit 36 provided in the network management unit 16 according to the present embodiment. In FIG. 6, the logical line reservation table 76 is constituted of a logical port number 78 corresponding to the logical line and a physical port number 80 corresponding to the physical line.

Taking the switch apparatus 10-1 of FIG. 1 for example, the logical port numbers L001 to L004 corresponding to the logical lines 14-1 to 14-4 are stored as the logical port number 78 in the logical line reservation table 76.

The switch apparatus 10-1 comprises 16 physical port units 20-1 to 20-16 as shown in FIGS. 2a and 2B, which correspond to the logical port numbers L001 to L004 of the logical lines 14-1 to 14-4, and the physical port units 20-1 to 20-16 are divided by 4 units from the head so that the physical port numbers P001 to P004, P005 to P008, P009 to P012 and P013 to P016 are stored.

The table contents of the logical line reservation table 76 are set through an operator's operation or the like when starting the interconnecting network (interconnect) of the parallel computer system in the network management apparatus 16, and the correspondence relationship between the logical lines and the physical port units in the switch apparatus 10-1 is set based on the contents of the logical line reservation table 76 when starting the network management apparatus 16. When the correspondence relationship between the logical lines and the physical port units by the logical line reservation table 76 is set in the switch apparatus 10-1, even when any one of several physical port units constituting a specific logical line is powered OFF and disabled to be in the unusable state, only the physical port units of the logical line according to the table contents can be used, and consequently it is possible to prevent other logical line from acquiring and using the physical port units in the unusable state.

FIG. 7 is an explanatory diagram of a port power supply control table for performing power supply ON/OFF control on the physical port units necessary for dynamically changing the line transmission speed of the logical line based on the necessary data transmission by the port control unit 38 provided in the network management apparatus 16 according to the present embodiment. In FIG. 7, when the line transmission speed per one physical line connected to the physical port unit is set at 1 Gbps, a logical line is constituted of four physical lines, and the necessary data transmission speed is classified into the following four modes according to the enable number of the physical line:

Mode 1=less than 1 Gbps;
Mode 2=no less than 1 Gbps less than 2 Gbps;
Mode 3=no less than 2 Gbps less than 3 Gbps;
Mode 4=no less than 3 Gbps.

The power supply control pattern indicating "○" for power supply ON and "X" for power supply OFF is set for the numbers P001 to P004 of the four physical port units corresponding to the physical lines according to the necessary data transmission speeds in the modes 1 to 4.

The port control unit 38 provided in the network management apparatus 16 of FIGS. 2A and 2B refer to the port power supply control table 82 of FIG. 7 on acquiring the necessary data transmission speed to acquire the 4-bit represented power supply control pattern of the corresponding physical port unit, and sends the same to the processor 28 of the switch apparatus 10-1 to operate the power supply control unit 30, and in the case of the power supply control pattern of Mode 3, for example, turns ON the power supply for the physical port units 20-1 to 20-3 and the external port units 22-1 to 22-3 in the logical line 14-1 to enable the physical lines 24-1 and 24-3, and turns OFF the power supply for the physical port unit 20-4 and the external port unit 22-4 to disable the physical line 24-4.

Figure 8:
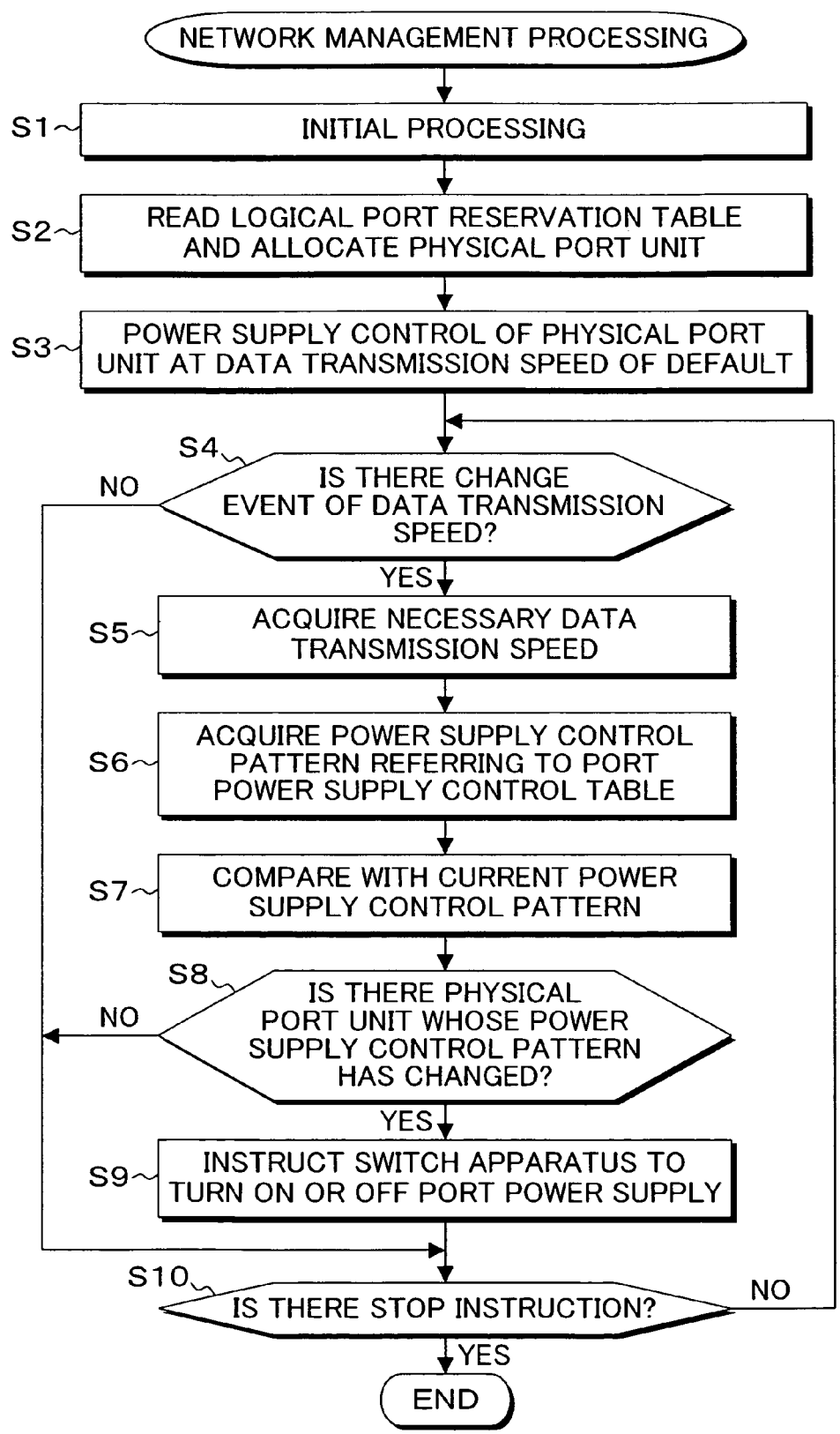
FIG. 8 is a flowchart of a network management processing according to the present embodiment.

FIG. 8 is a flowchart of a management processing by the network management apparatus 16 according to the present embodiment. In FIG. 8, when the network management apparatus 16 is powered ON, after the initial processing is performed in step S1, the logical line reservation table 76 of FIG. 6 is read in step S2 to assign the physical port units (physical lines) to the logical lines based on the table contents for the switch apparatuses 10-1, 10-2. Subsequently, in step S3, a default data transmission speed is acquired as the necessary data transmission speed to refer to the port power supply control table 82 of FIG. 7, and the power supply of the physical port units constituting a logical line is controlled by the power supply control pattern of Mode 4, for example, and the line transmission speed of the logical line is initialized at maximum 4 Gbps, for example. Subsequently, the presence or absence of a change event of the data transmission speed is checked in step S4, if the change event is present, the necessary data transmission speed subjected to the change event is acquired in step S5. In this case, the necessary data transmission speed to be acquired is given by any one of the above (1)

to (5). Next, in step S6, the port power supply control table 82 of FIG. 7 is referred to and the power supply control pattern corresponding to the necessary data transmission speed acquired in step S5 is acquired. Subsequently, in step S7 it is compared with the current power supply control pattern, and if the physical port unit whose power supply control pattern has changed is present in step S8, in step S9 an instruction of performing power supply ON or power supply OFF of the physical port unit which has changed for the switch apparatus is issued. The processing from steps S4 to S9 is repeated until a stop instruction is issued in step S10. A new power supply control pattern acquired in step S6 may be sent to the switch apparatus as it is without being compared with the current power supply control pattern to perform the power supply ON/OFF control of the physical port units constituting the logical line. Details for acquiring the necessary communication speed in step S5 of FIG. 8 will be described. The acquirement of the necessary communication speed employs any one of the above (1) to (5). For the acquirement of the necessary communication speed by constantly monitoring the logical line in (1), a packet counter for counting the data packets of the physical port units 20-1 to 20-16 is provided in the firmware to be executed in the processor 28 of the switch apparatus 10-1 shown in FIGS. 2A and 2B, and a value of the packet counter is notified to the network management apparatus 16 at a certain timing to dynamically change the line transmission speed of the logical line almost in real time for the change in the data transmission speed of the logical line constantly monitored. The acquirement of the necessary data transmission speed based on the number of usable computers in the (3) is based on the fact that all the computers in the parallel computer system constructed in the interconnecting network (interconnect) is not necessarily in the usable state for operation. When a computer in the unusable state is present in the parallel computer system, the computer does not make communication so that the amount of communication (data transmission speed) required for the entire interconnecting network is small. Thus, the network management apparatus 16 acquires the number of usable computers, and adjusts the line transmission speed in the logical line of the switch apparatus in order to provide only the necessary data transmission speed. Since the number and position of usable computers is managed by a manager in practical operation, the information on the number of usable computers is shared between the manager's using terminal and the network management apparatus 16 according to the present embodiment to acquire the number of usable computers on the network management apparatus 16 and to acquire the necessary data transmission speed for the corresponding logical line, thereby controlling the enable number of the physical port units constituting the logical line of the switch apparatus to assume the optimum line transmission speed.

Figure 9:
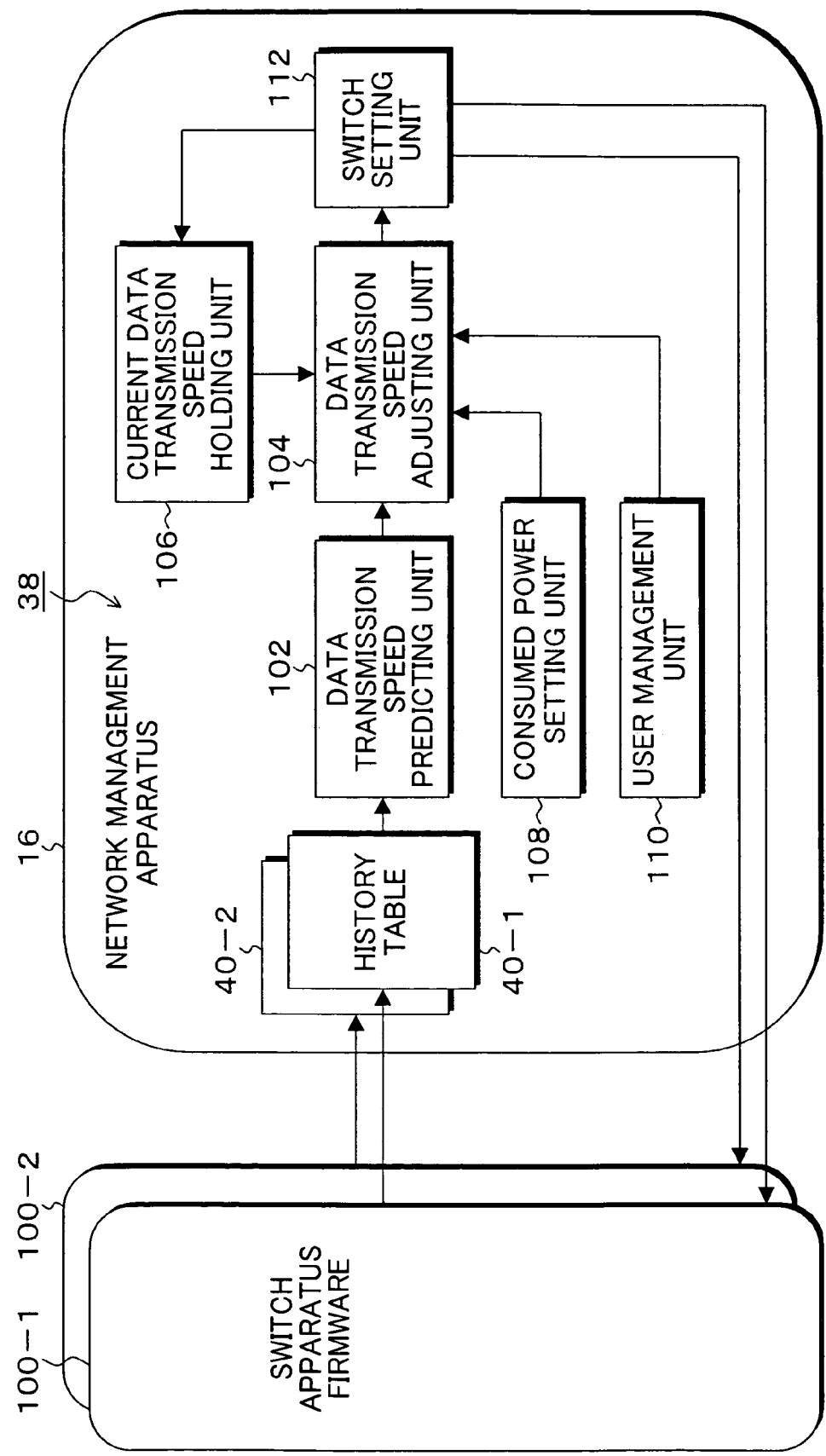
FIG. 9 is an explanatory diagram of a prediction processing function of a necessary data transmission speed by a port control unit according to the present embodiment.

FIG. 9 shows the network management apparatus according to the present embodiment, which corresponds to "(2) necessary data transmission speed by prediction based on communication history" described above. In FIG. 9, the port control unit 38 of the network management apparatus 16 is provided with history tables 40-1, 40-2, a data transmission speed predicting unit 102, a data transmission speed adjusting unit 104, a current data transmission speed holding unit 106, a consumed power setting unit 108, a user management unit 110 and a switch setting unit 112. The data transmission speed for the current logical line detected by the switch apparatus firmware 100-1, 100-2 executed by the processors of the switch apparatuses 10-1, 10-2 of FIG. 1 is acquired using the packet counter, for example, and is stored in the history tables 40-1, 40-2. The data transmission speed predicting unit 102 predicts the data transmission speed at an appropriate timing at which a necessary amount of history information for the statistic processing is accumulated in the history tables 40-1, 40-2. The prediction of the data transmission speed produces the next predicted time schedule, for example.

(1) Predicted time schedule of the necessary data transmission speed for each hour in 24 hours;

(2) Predicted time schedule of the necessary data transmission speed for each day in one week. If the predicted time schedule for each logical line based on such history tables 40-1, 40-2 can be created, the time of the time schedule is compared with the current time, and if the current time reaches the scheduled time, the corresponding predicted data transmission speed is output to the data transmission speed adjusting unit 104. The data transmission speed adjusting unit 104 adjusts and outputs the predicted data transmission speed based on the current data transmission speed of the current data transmission speed holding unit 106, the setting condition from the consumed power setting unit 108 and the setting condition from the user management unit 110. The setting information by the consumed power setting unit 108 includes weight setting or restriction of the maximum providing data transmission speed. The setting by the user management unit 110 includes the priority, the data transmission speed, the power increase/decrease and the like. The data transmission speed which has finished being adjusted in the data transmission speed adjusting unit 104 is given to the switch setting unit 112, where the power supply control pattern is produced according to the port power supply control table 82 shown in FIG. 7 based on the current data transmission speed for the predicted data transmission speed to be notified to the switch firmware 100-1, 100-2 in the switch apparatuses, and the power supply of the physical port units constituting the logical line is subjected to the ON/OFF control to switch to the enable number of the physical port units suitable for a new predicted data transmission speed, thereby providing the line transmission speed of the logical line according to the predicted data transmission speed.

Figure 10:
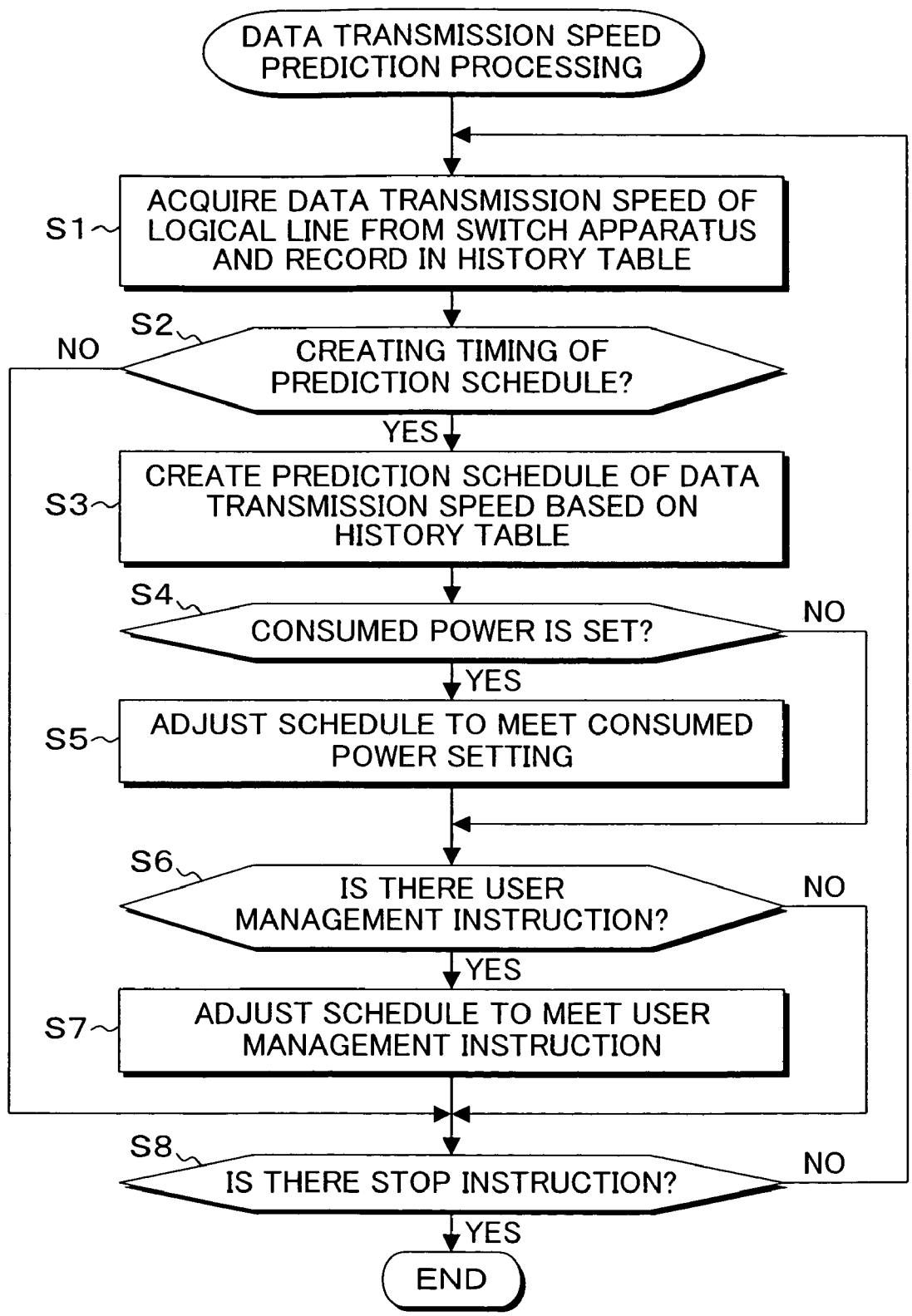
FIG. 10 is a flowchart of a prediction processing of a necessary data transmission speed by the port control unit of FIG. 9.

FIG. 10 is a flowchart of the data transmission speed prediction processing of FIG. 9. In FIG. 10, in step S1 the data transmission speed for each logical line is acquired from the switch apparatus to be recorded in the history table. Subsequently, when in step S2 a necessary amount of history information for the statistic processing determines the creation timing of the predicted schedule accumulated in the history table, the processing proceeds to step S3, where the next predicted time schedule is produced based on the history table.

Subsequently, when in step S4 the setting by the consumed power setting unit 108 is determined, in step S5 the predicted schedule is adjusted to meet the consumed power setting such as weight setting or restriction of the maximum providing data transmission speed. When in step S6 the setting by the user management unit 110 is determined, in step S7 the predicted schedule is adjusted to meet the user management instruction such as priority, data transmission speed and power increase/decrease. The processing from S1 to S7 is repeated until a stop instruction is determined in step S8.

Figure 11:
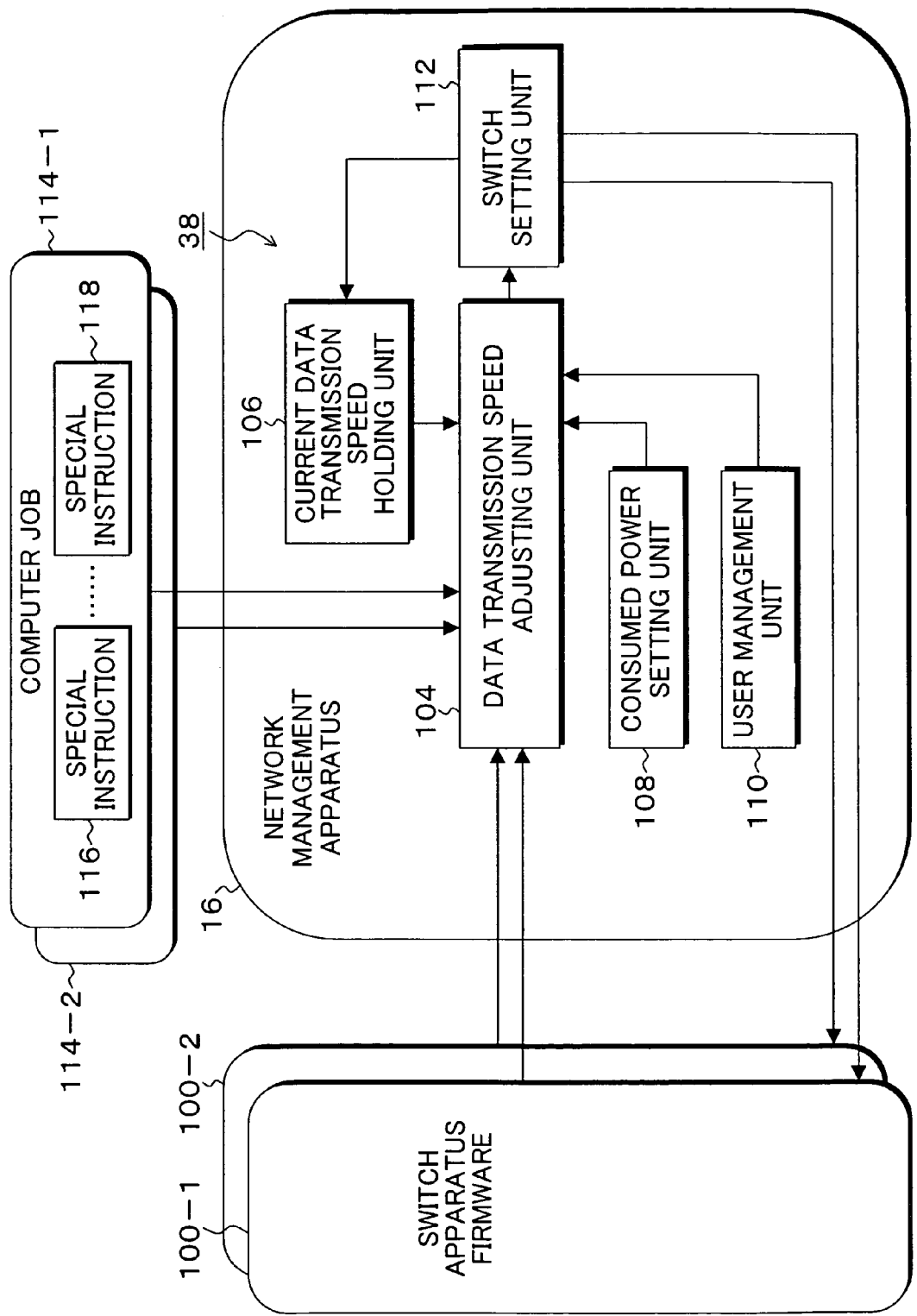
FIG. 11 is an explanatory diagram of a processing function based on an instruction of a necessary data transmission speed based on special instructions embedded in a computer job program by the port control unit according to the present embodiment.

FIG. 11 is an explanatory diagram of a function processing based on the instruction of the necessary data transmission speed based on special instructions embedded in the computer job program by the port control unit 36 provided in the network management apparatus 16 according to the present embodiment. This is a processing based on the acquirement of the necessary communication speed corresponding to the above (4). In FIG. 11, the port control unit 38 of the network management apparatus 16 is provided with the data transmission speed adjusting unit 104, the current data transmission speed holding unit 106, the consumed power setting unit 108, the user management unit 110 and the switch setting unit 112. On the other hand, the computers connected through the interconnecting network (interconnect) are provided with the computer jobs 114-1, 114-2, which are executed at an appropriate timing. In the present embodiment, the computer jobs 114-1, 114-2 are embedded with a special instruction 116 for securing the data transmission speed along with execution of the job, and a special instruction 118 for releasing the data transmission speed. The embedment of the special instructions 116, 118 in the program of the computer job 114-1 inserts the special instructions 116, 118 for securing and releasing the data transmission speed into the program at the computer user. Since a part necessary for communication in the program can be relatively easily identified other than the human-caused embedment of the special instructions 116, 118, a tool for finding a comparator or communication unit to embed a special instruction is used, thereby embedding the special instructions 116, 118 for securing and releasing the data transmission speed in the program. When the computer job 114-1 is executed by the program in which the special instructions 116, 118 for securing and releasing the data transmission speed are embedded, the instruction code of the special instruction 116 is decoded before the processing which requires the communication, the data transmission speed necessary for the job execution is notified to the data transmission speed adjusting unit 104 of the network management apparatus 16, and in response thereto the data transmission speed adjusting unit 104 performs the adjustment processing to output it to the switch setting unit 112, and outputs the power supply control pattern obtained from the port power supply control table 82 shown in FIG. 7 to the switch apparatus firmware 110-1 of the switch apparatus, thereby securing the line transmission speed of the logical line necessary for executing the computer job 114-1. When the job is terminated in the computer job 114-1, the special instruction 118 for releasing the data transmission speed is decoded, and a processing is performed for returning the line transmission speed of the logical line which has been increased during the job execution by the network management apparatus 16 to the original speed.

Figure 12:
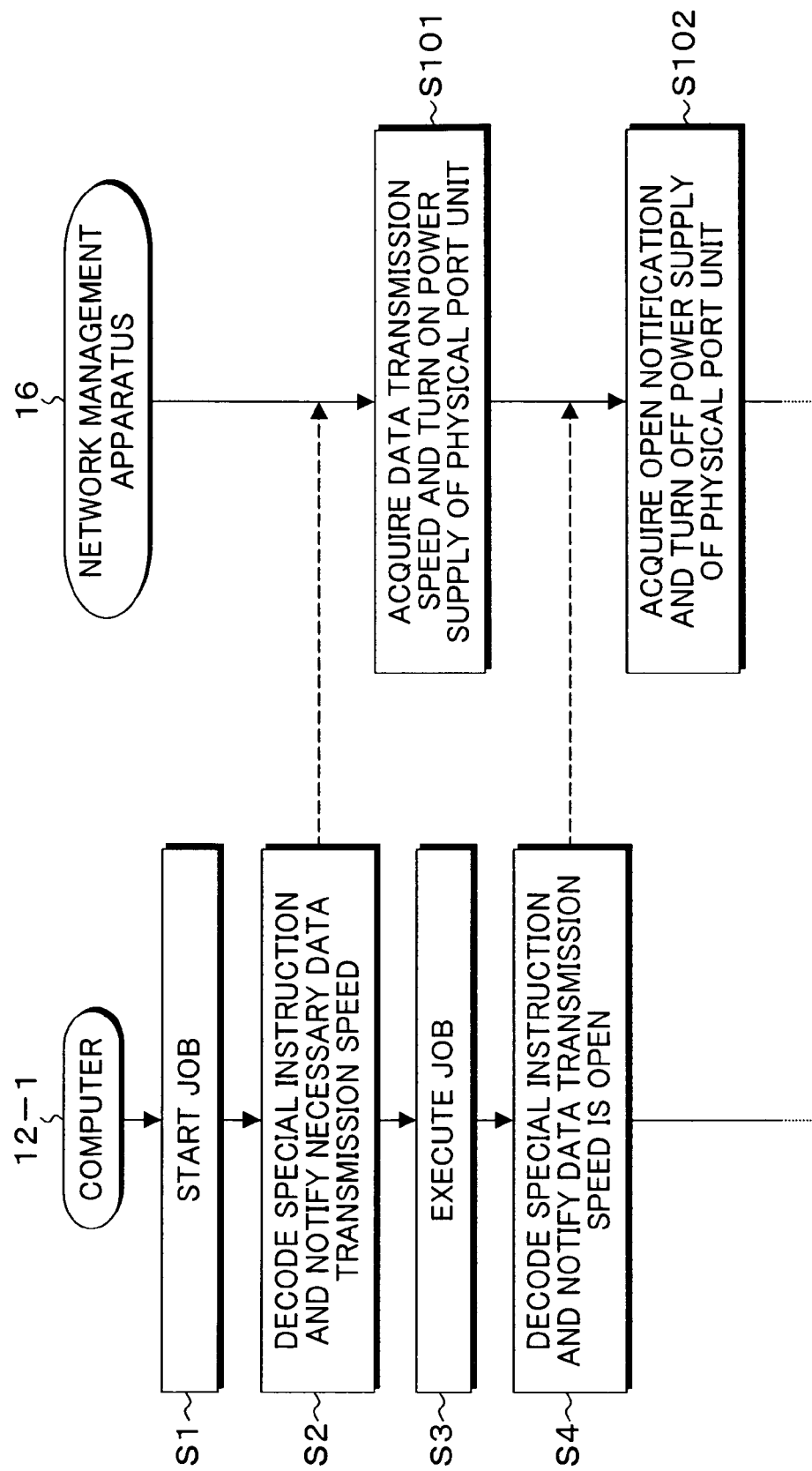
FIG. 12 is a time chart showing a processing of a computer and network management apparatus by the processing function of FIG. 11.

FIG. 12 is a time chart of a processing function based on an instruction of the necessary data transmission speed based on special instructions embedded in the job program of FIG. 11. In FIG. 12, when in step S1 the job is started in the computer processing, in step S2 the special instruction is decoded to notify the necessary data transmission speed to the network management apparatus 16. In response thereto, in the network management processing, in step S101 the data transmission speed is acquired, and the power supply control pattern of the physical port units is acquired from the port power supply control table 82 of FIG. 7 to perform the power supply ON control on the physical port units in order to increase the line transmission speed of the logical line. Subsequently, in the computer processing, in step S3 the job is executed, and then in step S4 the releasing of the data transmission communication speed is notified. In response to the notification on the releasing of the data transmission speed, in the network management processing, in step S102 the releasing notification is acquired to perform the power supply OFF control for recovering the power supply control state of the physical port units with respect to the switch apparatus. Even when the special instructions for securing and releasing the data transmission speed cannot be embedded in the program for executing the computer job as shown in FIG. 11 and FIG. 12, the user uses the terminal apparatus before executing the program in the computer to explicitly reserve the data transmission speed and to release the data transmission speed reserved at the end of the program, and notifies the reservation and releasing of the data transmission speed along with the user's operation to the network management apparatus 16, thereby, in order to secure the necessary data transmission speed along with the program execution, switching the line transmission speed based on the enable number of the physical port units constituting the logical line in the corresponding switch apparatus in the interconnecting network so as to secure the reserved data transmission speed. This is a processing corresponding to the acquirement of the necessary communication speed when executing the job by the computer user's reservation instruction according to the above (5). Further, the present embodiment provides a network management program to be executed by the network management apparatus 16, and the program will have the contents shown in the flowcharts of FIG. 8 and FIG. 10. Furthermore, the present invention provides a recording medium in which the network management program readable by the computer in the network management apparatus 16 is stored, and the recording medium includes portable storage medium such as CD-ROM, floppy (R) disk, DVD disk, magneto optical disk and IC card, storage apparatus such as hard disk drive provided inside or outside the computer system, and other computer system and its database. The above embodiment provides functions realized by the programs of the logical port constructing unit 36 and port control unit 38 in the network management apparatus 16 which manages the switch apparatuses in the interconnecting network constituting the parallel computer system, but all or part of these functions may be incorporated in the processor firmware in the switch apparatus.

The present embodiment includes appropriate modifications without losing the object and advantages of the present invention, and further is not limited by numeral values shown in the above embodiment.

What is claimed is:

1. A network management method for managing an interconnecting network which has a plurality of switch apparatuses each including physical port units, the switch apparatuses interconnecting computers through physical lines connected to the physical port units to construct a parallel computer system, comprising:

a logical line constructing step bundling groups of the physical lines into logical lines, respectively;

a data transmission speed acquiring step of acquiring a data transmission speed between computers interconnected through the physical lines; and a port control step enabling or disabling the physical lines bundled into a respective logical line by powering ON or powering OFF the physical port units to which the physical lines bundled into said respective logical line are connected, to dynamically change to a line transmission speed of said respective logical line in correspondence with the acquired data transmission speed wherein the Port control step produces a predicted time schedule of data transmission speed of said respective logical line from a communication history acquired from the switch apparatuses and, based on the predicted time schedule, powers ON or powers OFF the physical port units to which the physical lines bundled into said respective logical line are connected.

2. A network management method according to claim 1, wherein the physical port units are connected to the physical lines through external port units, and power supply ON/OFF control is performed on the physical port units and external port units.

3. A network management method according to claim 1, wherein the port control step comprises:
   a port disabling step of, when the acquired data transmission speed lowers a line transmission speed for each respective physical line bundled into said respective logical line, sequentially powering OFF and disabling physical port units provided for each of the physical lines bundled into said respective logical line according to a predetermined priority; and
   a port enabling step of, when the acquired data transmission speed exceeds a line transmission speed for each respective physical line bundled into said respective logical line, sequentially powering ON and enabling the disabled physical port units in a reverse order to the priority.

4. A network management method according to claim 1, wherein the port control step powers ON or powers OFF the physical port units based on the predicted time schedule for each hour in 24 hours or the predicted time schedule for each day in one week.

5. A network management method according to claim 1, wherein the port control step powers ON or powers OFF the physical port units based on the number of usable computers connected to the logical lines.

6. A network management method according to claim 1, wherein the port control step powers ON or powers OFF the physical port units based on the acquired data transmission speed along with execution of special instructions embedded at a start and end of a program job executed in the computers connected to the logical lines.

7. A network management method according to claim 1, wherein the port control step powers ON or powers OFF the physical port units based on a data transmission speed notified through a setting operation immediately before starting a job by the computers connected to the logical lines.

8. A computer-readable storage medium which stores a network management program for causing a computer to execute processes for managing an interconnecting network which has a plurality of switch apparatuses each including physical port units, the switch apparatuses interconnecting computers through physical lines connected to the physical port units to construct a parallel computer system, the processes comprising:
   a logical line constructing step bundling groups of the physical lines into logical lines, respectively;
   a data transmission speed acquiring step of acquiring a data transmission speed between computers interconnected through the physical lines; and
   a port control step enabling or disabling the physical lines bundled into a respective logical line by powering ON or powering OFF the physical port units to which the physical lines bundled into said respective logical line are connected, to dynamically change to a line transmission speed of said respective logical line in correspondence with the acquired data transmission speed,
   wherein the port control step powers ON or powers OFF the physical port units based on a predicted time schedule of the data transmission speed for each hour in 24 hours or a predicted time schedule of the data transmission speed for each day in one week;
   wherein the port control step produces the predicted time schedule from a communication history acquired from the switch apparatuses.

9. A storage medium according to claim 8, wherein the pert control step comprises:
   a port disabling step of, when the acquired data transmission speed lowers a line transmission speed for each physical line bundled into said respective logical line, sequentially powering OFF and disabling physical port units provided for each of the physical lines bundled into said respective logical line according to a predetermined priority; and
   a port enabling step of, when the acquired data transmission speed exceeds a line transmission speed for each physical line bundled into said respective logical line, sequentially powering ON and enabling the disabled physical port units in reverse order to the priority.

10. A storage medium according to claim 8, wherein the port control step powers ON or powers OFF the physical port units based on the number of usable computers connected to the physical lines in the switch apparatuses.

11. A storage medium according to claim 8, wherein the port control step powers ON or powers OFF the physical port units based on execution of special instructions embedded at a start and end of a program job executed by the computers connected to the logical lines.

12. A storage medium according to claim 8, wherein the port control step powers ON or powers OFF the physical port units based on a setting operation immediately before starting a job by the computers connected to the logical lines.

13. A network management system comprising:
   an interconnecting network which has a plurality of switch apparatuses each including physical port units, the switch apparatuses interconnecting computers through physical lines connected to the physical port units to construct a parallel computer system; and
   a network management apparatus for managing the switch apparatuses, the network management apparatus comprising:
   a logical line constructing unit bundling groups of the physical lines into logical lines, respectively;
   a data transmission speed acquiring unit acquiring a data transmission speed between computers interconnected through the physical lines; and
   a port control unit enabling or disabling the physical lines bundled into a respective logical line by powering ON or powering OFF the physical port units to which the physical lines bundled into said respective logical line are connected, to dynamically change to a line transmission speed of said respective logical line in correspondence with the acquired data transmission speed,
   wherein the port control unit produces a predicted time schedule of data transmission speed of said respective logical line from a communication history acquired from the switch apparatuses and, based on the predicted time schedule, powers ON or powers OFF the physical port units to which the physical lines bundled into said respective logical line are connected.

14. A network management system according to claim 13, wherein the physical port units are connected to the physical lines through external port units, and power supply control is performed on the physical port units and external port units.

15. A network management system according to claim 13, wherein the port control unit comprises:
   a port disabling step of, when the acquired data transmission speed lowers a line transmission speed for each physical line bundled into said respective logical line, sequentially powering OFF and disabling physical port units provided for each of the physical lines bundled into said respective logical line according to a predetermined priority; and a port enabling step of, when the acquired data transmission speed exceeds a line transmission speed for each physical line bundled into said respective logical line, sequentially powering ON and enabling the disabled physical port units in reverse order to the priority.

* * * * *

UNITED STATES PATENT AND TRADEMARK OFFICE
CERTIFICATE OF CORRECTION

PATENT NO.         : 7,602,799 B2
APPLICATION NO.    : 11/476630
DATED              : October 13, 2009
INVENTOR(S)        : Ikeda et al.

It is certified that error appears in the above-identified patent and that said Letters Patent is hereby corrected as shown below:

Column 12, Line 57, change "Port" to --port--.

Column 14, Line 1, change "pert" to --port--.

Signed and Sealed this

Twenty-ninth Day of December, 2009

David J. Kappos
*Director of the United States Patent and Trademark Office*